United States Patent
Lin et al.

(10) Patent No.: US 8,437,132 B2
(45) Date of Patent: May 7, 2013

(54) COMPUTER ENCLOSURE WITH COVER PLATE

(75) Inventors: Yang-Ming Lin, Shenzhen (CN); Dao-Wei Lei, Shenzhen (CN); Ri-Dong Huang, Shenzhen (CN); Hsuan-Tsung Chen, Taipei Hsien (TW); Guang-Yao Lee, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 227 days.

(21) Appl. No.: 12/879,345

(22) Filed: Sep. 10, 2010

(65) Prior Publication Data
US 2011/0267774 A1    Nov. 3, 2011

(51) Int. Cl.
*H05K 5/00* (2006.01)
*H05K 7/00* (2006.01)

(52) U.S. Cl.
USPC ............. 361/679.58; 361/679.59; 361/679.6; 312/223.2

(58) Field of Classification Search ............. 361/679.58, 361/679.59, 679.6; 312/223.2
See application file for complete search history.

(56) References Cited

U.S. PATENT DOCUMENTS

| 5,926,916 A * | 7/1999 | Lee et al. ......................... 16/230 |
| 7,639,495 B2 * | 12/2009 | Chen et al. ................. 361/679.6 |
| 2006/0156320 A1 * | 7/2006 | Lee ............... 720/647 |
| 2007/0075612 A1 * | 4/2007 | Zhao .......................... 312/223.2 |
| 2008/0222666 A1 * | 9/2008 | Lee et al. ...................... 720/647 |

* cited by examiner

*Primary Examiner* — Anthony Haughton
(74) *Attorney, Agent, or Firm* — Altis Law Group, Inc.

(57) ABSTRACT

A computer enclosure includes a computer bezel with an opening defined therein, a cover plate for covering the opening, and an actuating module. The cover plate is pivotably attached to a front side of the computer bezel. The actuating module includes a mounting bracket attached to a rear side of the computer bezel and an actuating member pivotably attached to the mounting bracket. The actuating member is capable of rotating between an extended position, where the cover plate is pushed open by the actuating member to expose the opening, and a retracted position, where the cover plate is closed to cover the opening.

15 Claims, 8 Drawing Sheets

COMPUTER ENCLOSURE WITH COVER PLATE

BACKGROUND

1. Technical Field

The present disclosure relates to computer enclosures, and more particularly a computer enclosure with a cover plate.

2. Description of Related Art

Many computers employ enclosures or cases which include peripheral/drive bays for receiving interchangeable peripheral drives such as floppy disk drives, optical disk drives, and tape drives. Typically, these bays can be accessed through an opening in the front wall, or bezel, of the computer case. When one or more bays within the computer are empty (i.e., do not contain a peripheral device or drive), a cover or panel is provided for covering the opening in the front wall to prevent environmental contaminants from entering the computer.

In present computers, installation and removal of the cover is time consuming, difficult, and increases manufacturing costs for the computer when peripheral devices or drives are to be installed in the computer, and frustrating to the user of the computer who wishes to install peripheral devices or drives in after market situations.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
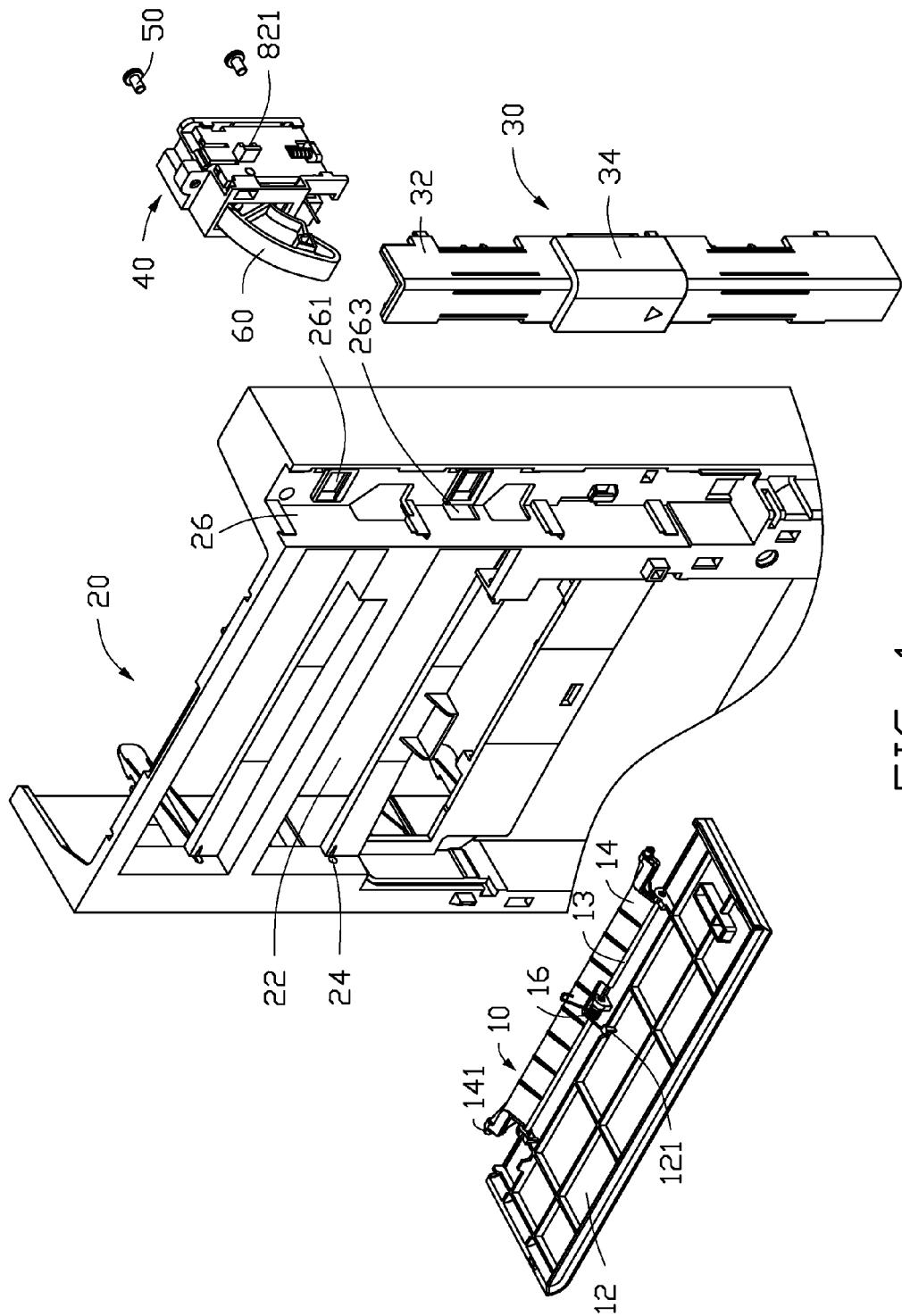
FIG. 1 is an exploded partial view of a computer bezel to which a cover plate is to be attached according to an embodiment.

Referring to FIG. 1, an embodiment of a computer disclosure includes a cover plate 10, a computer bezel 20, an operation module 30, an actuating module 40, and a pair of fasteners 50 for securing the actuating module 40 to a rear side of the computer bezel 20.

The cover plate 10 includes a main body 12 and a hinge 14 pivotably connected to the main body 12 with a pivot shaft 13. A torsion spring 16 is attached to the pivot shaft 13. The hinge 14 has a pair of pivot posts 141 protruding from opposite ends thereof. The main body 12 has a retaining hook 121 adjacent to the hinge 14 for engaging with one end of the torsion spring 16.

An opening 22 is defined in the computer bezel 20 for exposing a drive bay (not shown) disposed in the computer enclosure. A pair of circular cavities 24 is defined in the computer bezel 20 for receiving the pivot posts 141 of the cover plate 10. An L-shaped hollow portion 26 is formed at an upper corner of the computer bezel 20 for mounting the operation module 30. A plurality of securing openings 261 is defined at one side wall of the hollow portion 26. A rectangular aperture 263 is defined at another side wall of the hollow portion 26. The rectangular aperture 263 is adjacent to one of the securing openings 261.

Figure 2:
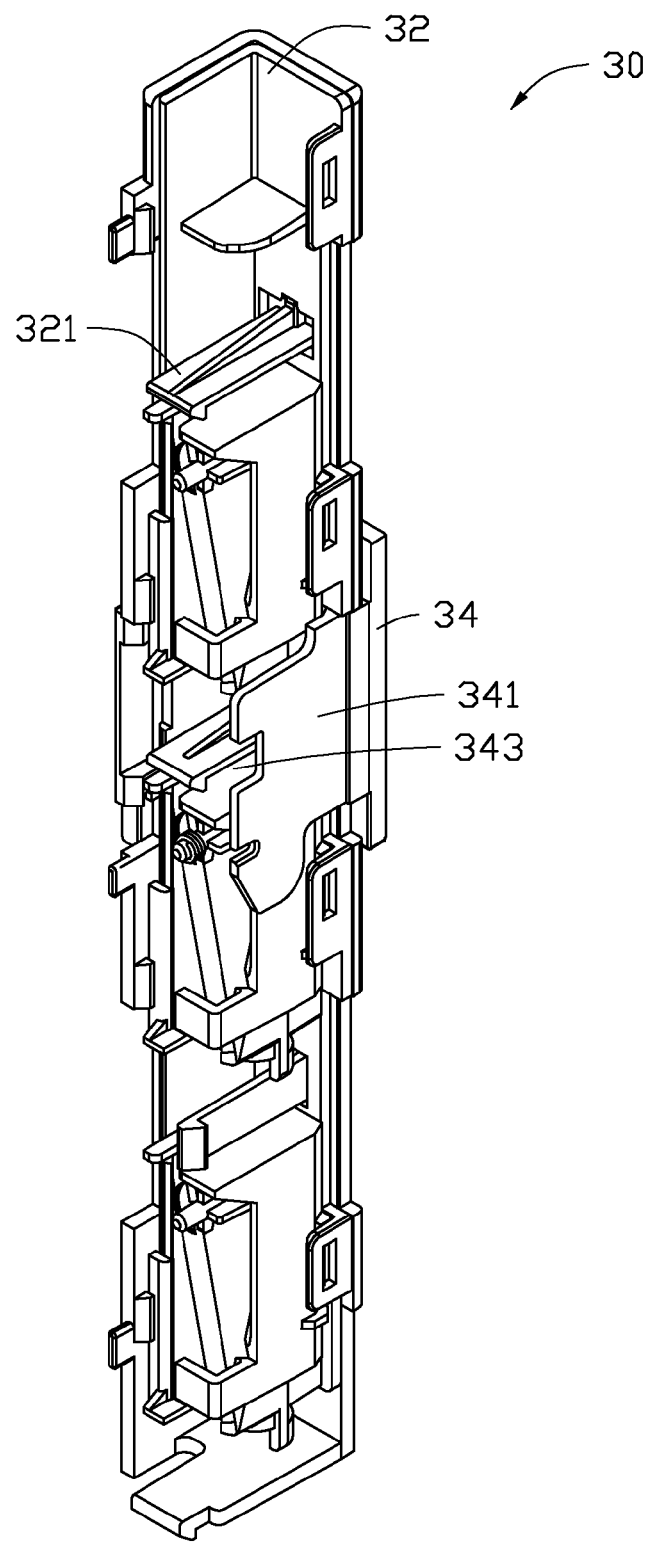
FIG. 2 is another view of an operation module in FIG. 1.

Referring to FIGS. 1 and 2, the operation module 30 includes an L-shaped support member 32 and a handle member 34 attached to the support member 32. The handle member 34 is slidable along the support member 32 along a lengthwise direction. The support member 32 includes a plurality of resilient pieces 321 protruding from a rear side thereof. Each of the resilient pieces 321 has a hook (not labeled) formed at a distal end thereof for engaging with an edge of the securing opening 261 of the computer bezel 20. The handle member 34 includes an L-shaped main body (not labeled) contacting an exterior surface of the support member 32 and an engaging piece 341 perpendicularly extending from an edge of the main body. A gap 343 is defined in the engaging piece 341.

Figure 3:
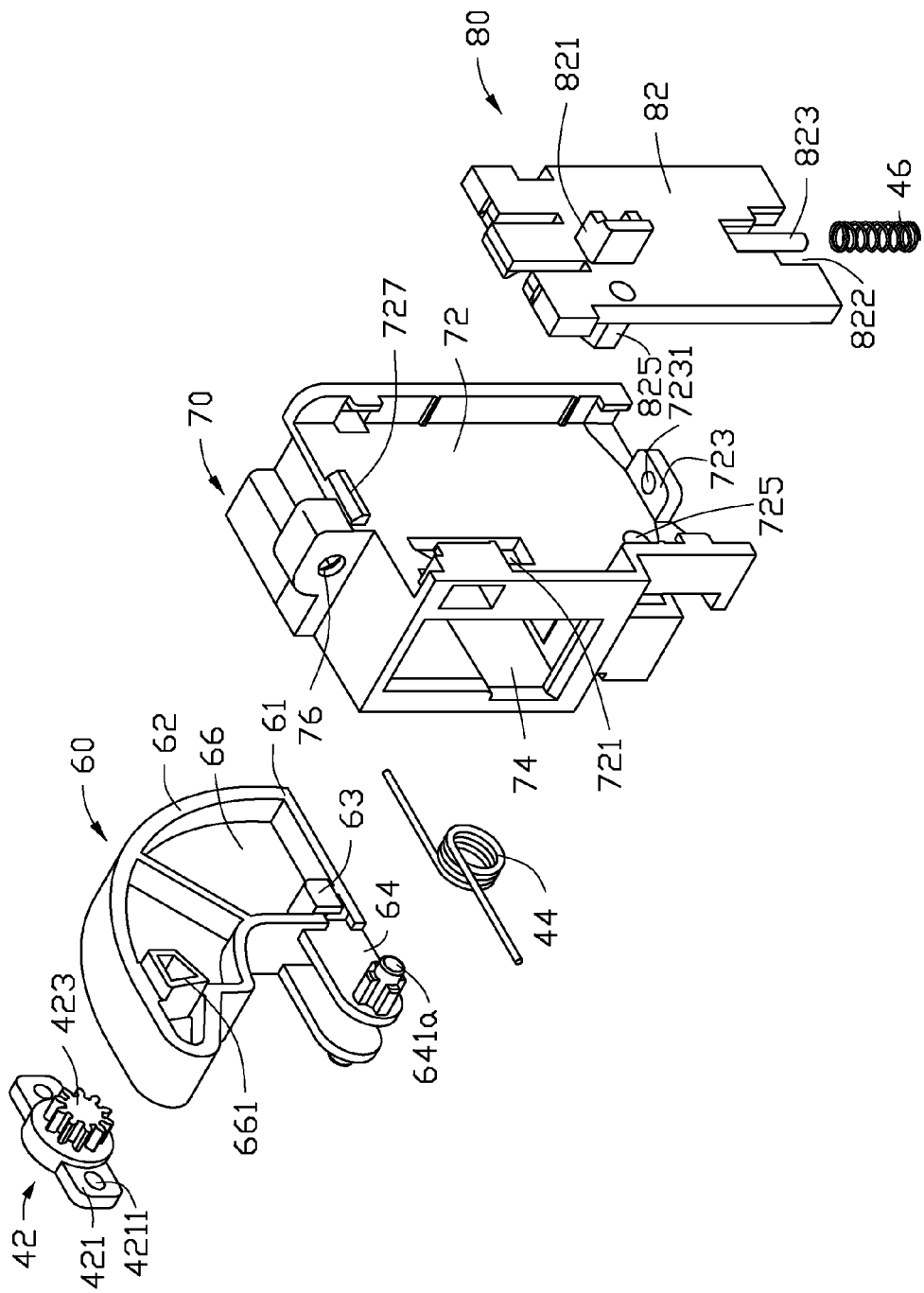
FIG. 3 is an exploded view of an actuating module in FIG. 1.
Figure 4:
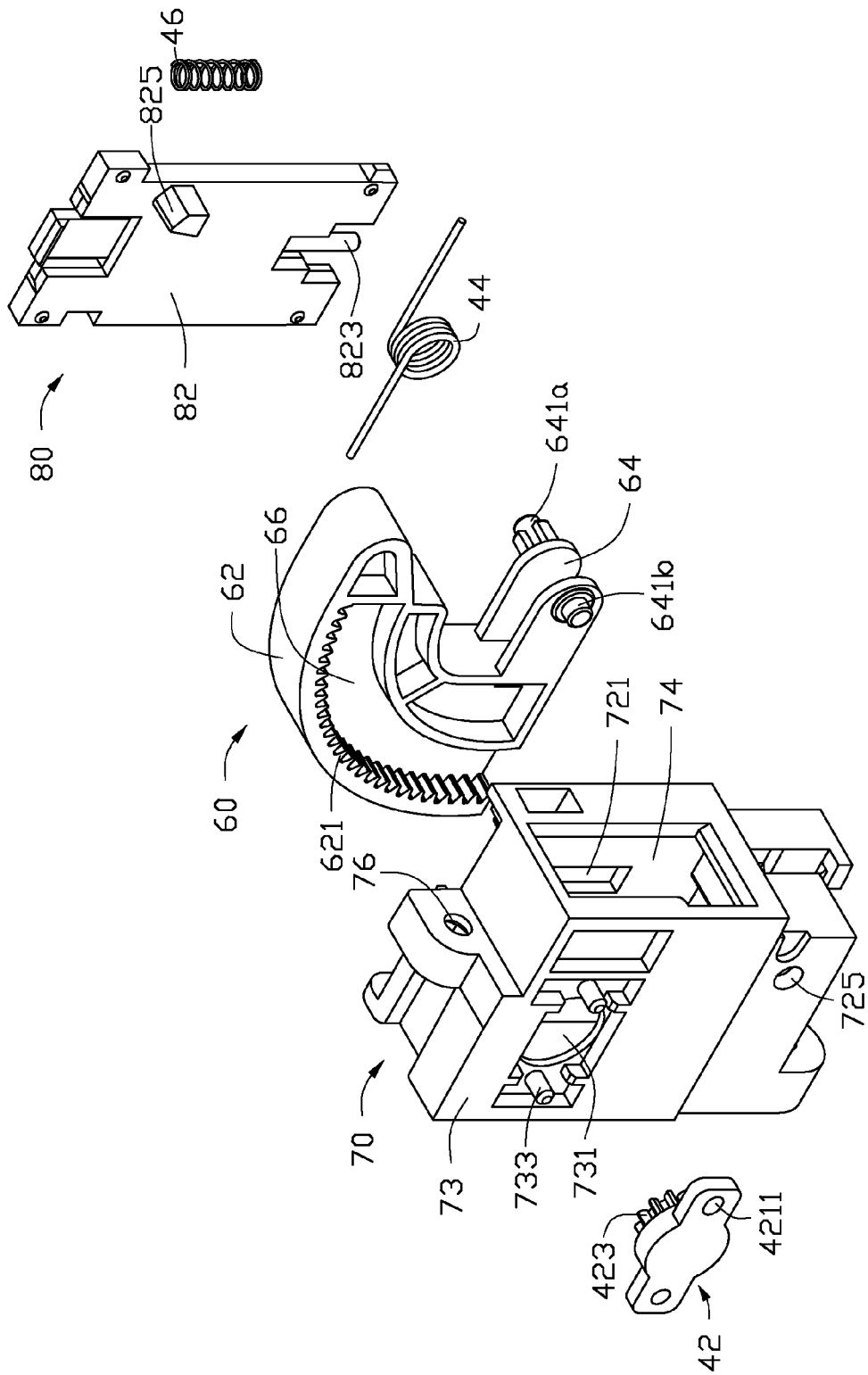
FIG. 4 is similar to FIG. 3, but viewed from another aspect.

Referring to FIGS. 3 and 4, the actuating module 40 includes a damping member 42, an actuating member 60, a torsion spring 44, a mounting bracket 70, a latch member 80, and a resilient member 46.

The damping member 42 includes a head 421 and a damping wheel 423 extending from a central portion of the head 421. A pair of mounting holes 4211 is defined in opposite ends of the head 421.

The mounting bracket 70 includes a first side wall 72 and a second side wall 73 opposite to the first side wall 72. A hollow accommodating portion 74 is disposed between the first side wall 72 and the second side wall 73 for receiving the actuating member 60. A slot 721 is defined in the first side wall 72. A support tab 723 protrudes from a lower edge of the first side wall 72. A mounting hole 7231 is defined in the support tab 723. A holding tab 727 is formed at an upper portion of the first side wall 72. A pair of pivot holes 725 is respectively defined in the first side wall 72 and the second side wall 73 for pivotably attaching the actuating member 60 thereto. A pair of securing holes 76 is respectively defined in a top portion and a bottom portion of the mounting bracket 70 for receiving the fasteners 50. A circular opening 731 is defined in the second side wall 73 for receiving the damping wheel 423 of the damping member 42. A pair of mounting posts 733 is disposed at opposite sides of the circular opening 731 and protruded from the second side wall 73 corresponding to the mounting holes 4211 of the damping member 42.

The actuating member 60 includes a main body 61 and a pair of parallel arms 64 extending from a lower portion of the main body 61. Pivot posts 641a, 641b are protruding from the pair of arms 64 respectively. The main body 61 of the actuating member 60 includes an arc-shaped section 62 and a dividing panel 66. The dividing panel 66 connects with an inner surface of the arc-shaped section 62 for dividing the arc-shaped section 62 into a first portion and a second portion. A damping guideway 621 (see FIG. 4) is formed in the inner surface of the first portion of arc-shaped section 62. A resisting block 661 protrudes from the dividing panel 66 and connects with the inner surface of the second portion of the arc-shaped section 62. The resisting block 661 has a slant surface at a bottom thereof.

The latch member 80 includes a panel 82, an engaging block 821 protruding from one side of the panel 82, and a resisting block 825 protruding from another side of the panel 82. The resisting block 825 has a slanted surface at a top thereof. A cutout 822 is defined in a lower portion of the panel 82. A mounting post 823 extends from a top edge of the cutout 822 for attaching the resilient member 46 thereto.

Figure 5:
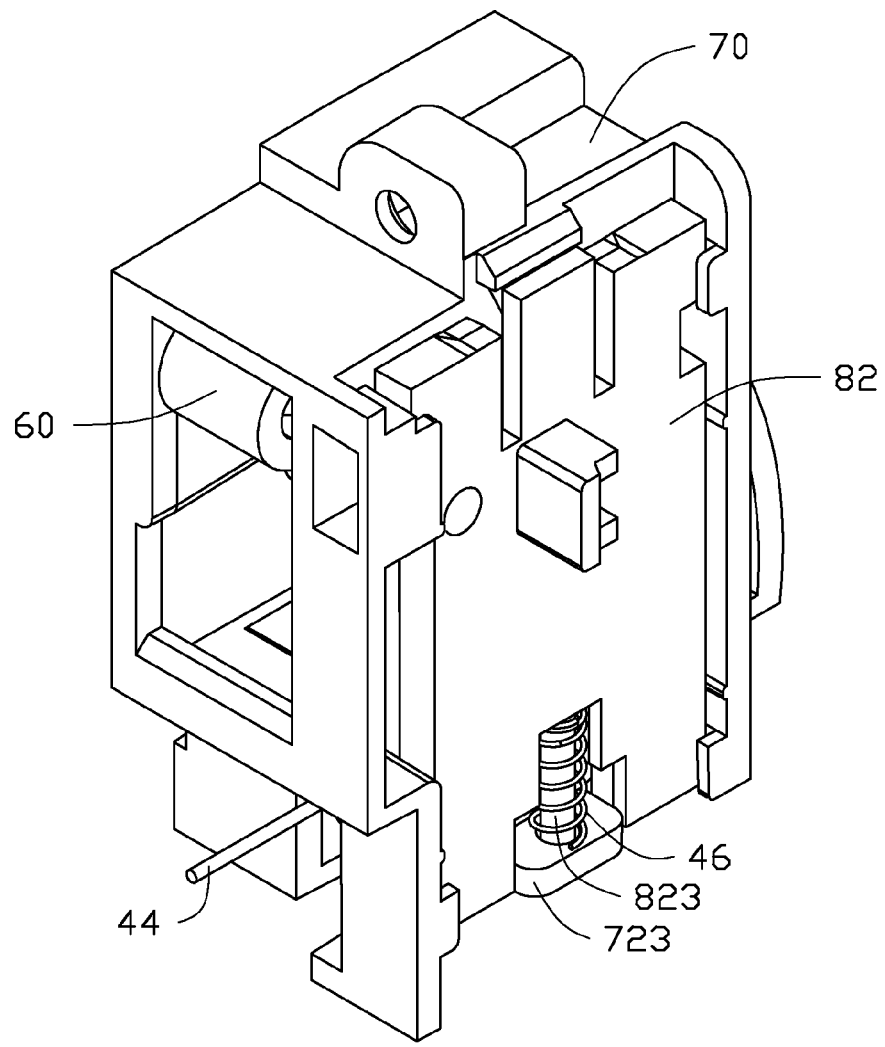
FIG. 5 is an assembled view of FIG. 3.
Figure 6:
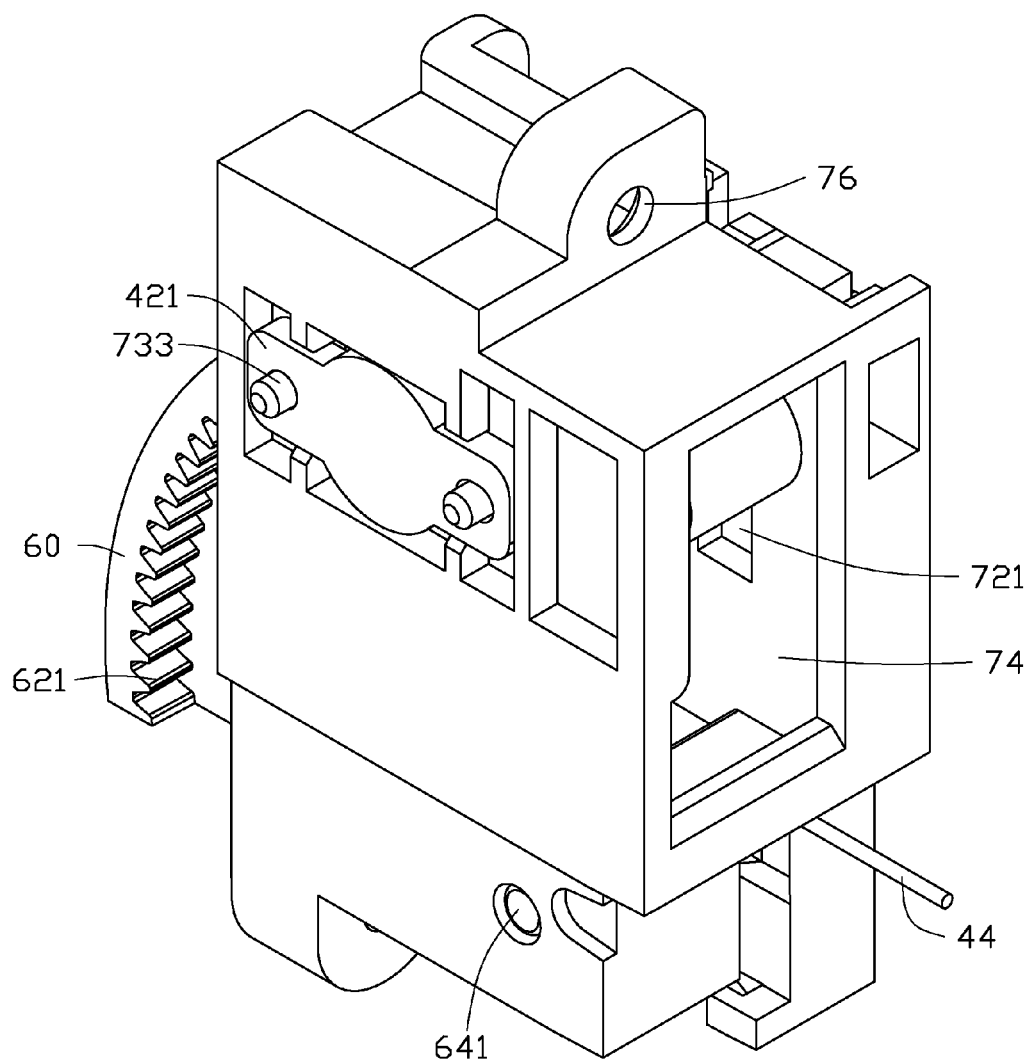
FIG. 6 is an assembled view of FIG. 4.

Referring to FIGS. 5 and 6, in assembly of the actuating module 40, the resilient member 46 is attached to the mounting post 823 of the latching member 80. A distal end of the mounting post 823 is received in the mounting hole 7231 of the support tab 723. Then the resilient member 46 is disposed between the top edge of the cutout 822 and the support tab 723 to provide bias force to urge the latch member 80 to rebound to its original position. A top end of the latch member 80 abuts the holding tab 727 for preventing the latched member 80 from sliding away from the mounting bracket 70. The resisting block 825 of the latch member 80 extends into the slot 721 of the mounting bracket 70. The torsion spring 44 is attached to one of the pivot posts 641a of the actuating member 60. The pivot posts 641a, 641b of the actuating member 60 are engaged into the pivot holes 725 of the mounting bracket 70. One end of the torsion spring 44 is engaged with an inner surface of a tab 63 of the actuating member 60. Another end of the torsion spring 44 is secured to a bottom surface of the mounting bracket 70. The mounting posts 733 of the mounting bracket 70 are inserted in the mounting holes 4211 of the damping member 42 to attach the damping member 42 to the second side wall 73 of the mounting bracket 70. The damping wheel 423 of the damping member 42 is inserted in the circular opening 731 of the mounting bracket 70 and engaged with the damping guide way 621 of the actuating member 60. When the actuating member 60 is in a retracted position (see FIGS. 5 and 6), the resisting block 825 of the latch member 80 abuts the resisting block 661 of the actuating member 60, and the torsion spring 44 is elastically flexed and has the potential energy to urge the actuating member 60 to rotate to an extended position (see FIG. 1 or FIG. 8). If the latch member 80 slides down, the resisting block 825 of the latch member 80 slides below the resisting block 661 of the actuating member 60, and the actuating member 60 is released and automatically rotates to the extended position by a force generated from the torsion spring 44. During the rotation of the actuating member 60, the damping member 42 is engaged with the damping guide way 621 of the actuating member 60, which can slow down the rotation speed of the actuating member 60.

Figure 7:
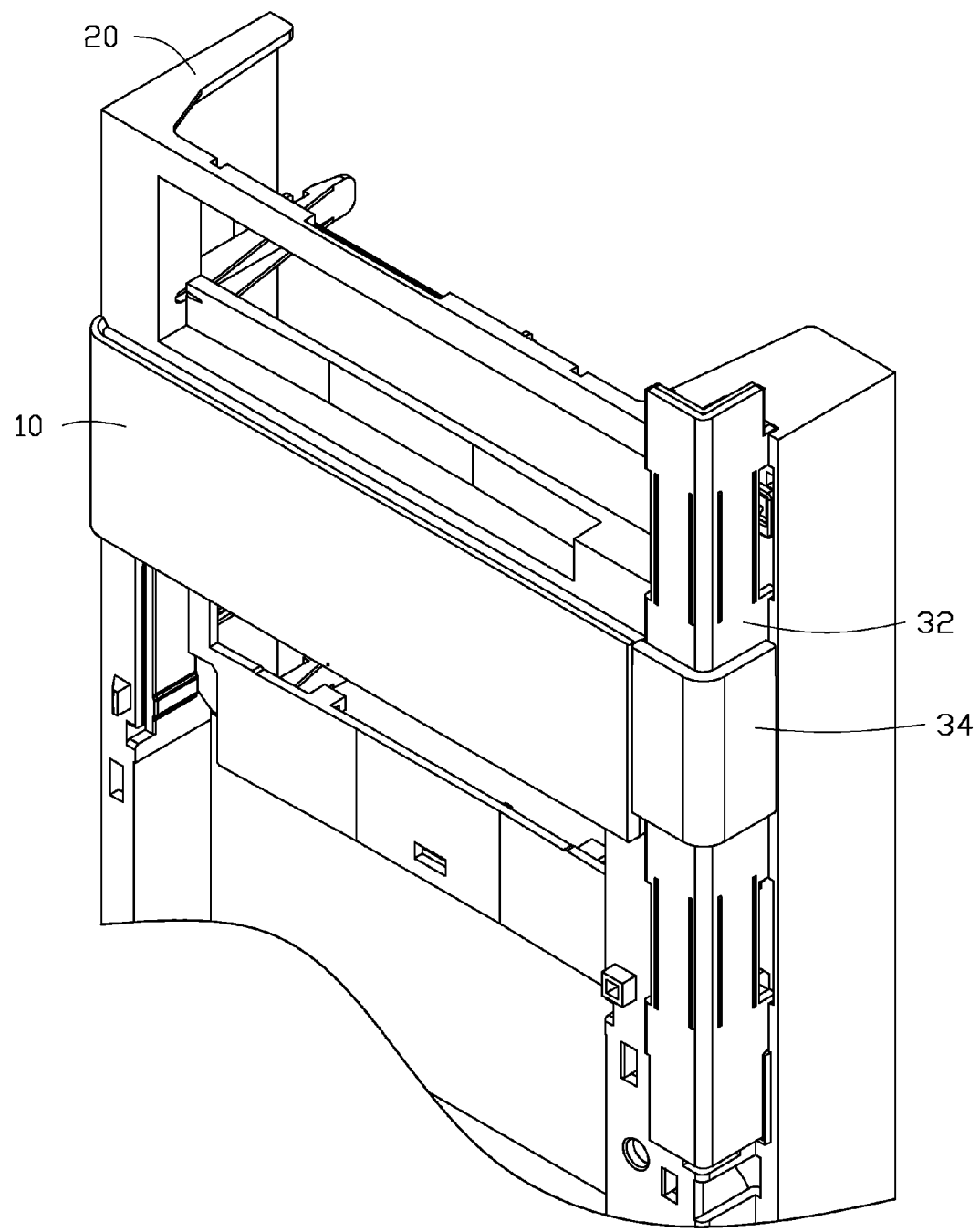
FIG. 7 is an assembled view of FIG. 1.

Referring to FIG. 7, in assembly of the computer enclosure, the operating module 30 is mounted in the hollow portion 26 of the computer bezel 20. The resilient pieces 321 of the operating module 30 are inserted in the securing openings 261 in the computer bezel 20. The hooks at distal ends of the resilient pieces 321 are engaged with edges of the securing openings 261 for securing the support member 32 of the operation module 30 to the computer bezel 20. The gap 343 of the engaging piece 341 of the handle member 34 is aligned with the aperture 263 of the computer bezel 20. The fasteners 50 are inserted into the securing holes 76 of the mounting bracket 70 for securing the actuating module 40 to the rear side of the computer bezel 20. The engaging block 821 of the latch member 80 is inserted through the aperture 263 of the computer bezel 20 and engages the gap 343 of the handle member 34. Then the latch member 80 can slide together with the handle member 34.

Figure 8:
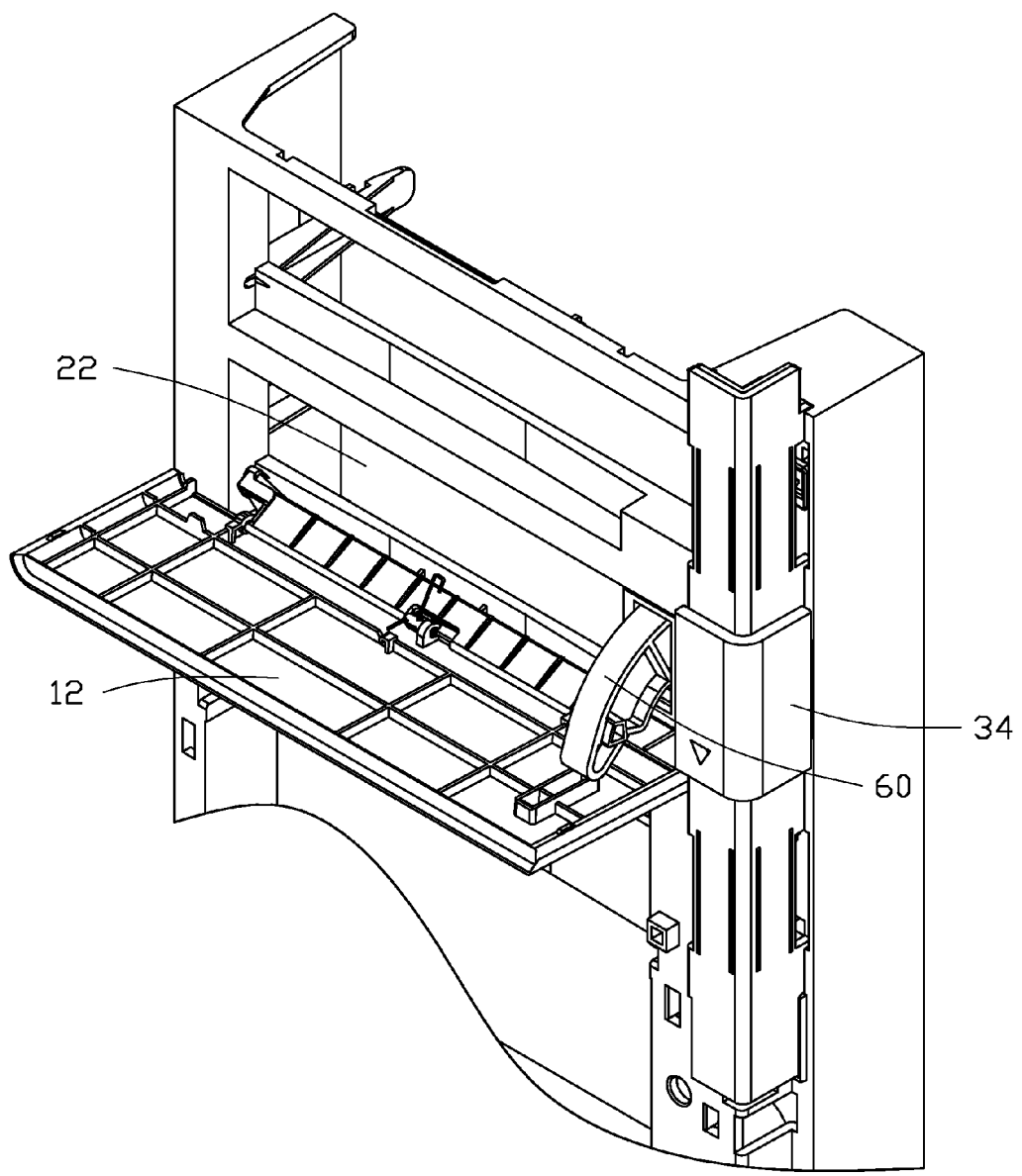
FIG. 8 is similar to FIG. 7, but showing the cover plate within an open state.

Referring to FIG. 8, to expose the opening 22, the handle member 34 is slid down to urge the latch member 80 to slide down. When the resisting block 825 of the latch module 80 is slid below the resisting block 661 of the actuating member 60, the actuating member 60 is released, and the torsion spring 44 urges the actuating member 60 to rotate to the extended position. At the extended position, the actuating member 60 pushes the cover plate 10 to an open state where the opening 22 is exposed.

To cover the opening 22, the actuating member 60 is pushed to rotate to the retracted position. The resisting block 661 of the actuating member 60 depresses the resisting block 825 of the latch member 80. The resilient member 46 is compressed. After the slant surface of the resisting block 661 of the actuating member 60 is slid across the slant surface of the resisting block 825 of the latch member 80, the latch member 80 pressed by the resilient member 46. The resisting block 661 of the actuating member 60 abuts the resisting block 825 of the latch member 80 to return the actuating member 60 to the retracted position. Then the torsion spring 16 biases the main body 12 of the cover plate 10 to rotate to a closed state where the opening 22 is covered by the cover plate 10.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A computer enclosure comprising:
   a computer bezel with an opening defined therein;
   a cover plate, pivotably secured to a front side of the computer bezel, capable of covering the opening; and
   an actuating module comprising a mounting bracket secured to a rear side of the computer bezel and an actuating member pivotably secured to the mounting bracket;
   wherein the actuating member is capable of rotating between an extended position, where the cover plate is pushed open by the actuating member to expose the opening, and a refracted position, where the cover plate is closed to cover the opening;
   the actuating module further comprises a latch member, the mounting bracket comprises a holding tab and a support tab, the latch member is slidably attached between the holding tab and the support tab, and the latch member is capable of preventing the actuating member from rotating from the retracted position to the extended position; and
   a slot is defined in the mounting bracket, the latch member comprises a resisting block extending through the slot and abutting the actuating member.

2. The computer enclosure of claim 1, further comprising a handle member slidably attached to the computer bezel, wherein the handle member is engaged with the latch member, and the latch member is movable together with the handle member to a position where the actuating member is released from the resisting block of the latch member.

3. The computer enclosure of claim 2, wherein the latch member comprises an engaging block, the handle member comprises an engaging piece with a gap defined therein, and the engaging block of the latch member is engaged in the gap.

4. The computer enclosure of claim 3, wherein an aperture is defined in the computer bezel, and the engaging block extends through the aperture and engages with the gap of the handle member.

5. The computer enclosure of claim 4, wherein the latch member comprises a post with a spring attached thereto, the spring is located between the latch member and the support tab and biases the latch member towards an original position.

6. The computer enclosure of claim 5, wherein the actuating member comprises a main body and a pair of arms extending from the main body, a pair of pivot posts extends from the arms, and the mounting bracket defines a pair of pivot holes for receiving the pair of pivot posts.

7. The computer enclosure of claim 6, further comprising a torsion spring attached to one of the pair of pivot posts of the actuating member, one end of the torsion spring is engaged with the mounting bracket, another end of the torsion spring is engaged with the actuating member, and the torsion spring biases the actuating member rotating towards the extended position.

8. The computer enclosure of claim 1, wherein the cover plate comprises a main body, a hinge pivotably attached to the main body via a pivot shaft, and a torsion spring attached to the pivot shaft, and the torsion spring is capable of retaining the cover plate at a closed state when the actuating member is at the retracted position.

9. A computer enclosure comprising:
a computer bezel with an opening defined therein;
a cover plate, secured to a front side of the computer bezel, capable of rotating between a closed state, where the opening is covered, and an open state, where the opening is exposed; and
an actuating module comprising a mounting bracket, secured to a rear side of the computer bezel, and an actuating member pivotably secured to the mounting bracket;
wherein the actuating member is capable of rotating between an retracted position, where the cover plate is at the closed state, and an extended position, where the actuating member pushes the cover plate to the open state;
the actuating module further comprises a latch member, the mounting bracket comprises a holding tab and a support tab, the latch member is slidably attached between the holding tab and the support tab, and the latch member is capable of preventing the actuating member from rotating from the retracted position to the extended position;
the mounting bracket comprises a first side wall, a second side wall, and a hollow accommodating portion disposed between the first side wall and the second side wall, wherein the actuating member is received in the hollow accommodating portion and pivotably engaged with the first side wall and the second side wall; and
a slot is defined in the first side wall, and the latch member comprises a resisting block extending through the slot and abutting the actuating member.

10. The computer enclosure of claim 9, further comprising a handle member slidably attached to the computer bezel, wherein the handle member comprises an L-shaped main body and an engaging piece extending from an edge of the L-shaped main body, the engaging piece of the handle member has a gap defined therein, and the latch member comprises an engaging block engaging in the gap of the handle member.

11. The computer enclosure of claim 9, wherein the mounting bracket comprises a support tab extending from a lower edge of the first side wall, the latch member comprises a post with a spring attached thereto, the spring is located between the latch member and the support tab and biases the latch member towards an original position.

12. The computer enclosure of claim 9, wherein the actuating member comprises a main body, a pair of arms extending from the main body, and a pair of pivot posts extending from the arms, and the mounting bracket defines a pair of pivot holes for receiving the pivot posts.

13. The computer enclosure of claim 12, further comprising a damping member engaged with the actuating member, and the main body comprises an arc-shaped section with a damping guideway engaged with the damping member.

14. The computer enclosure of claim 13, further comprising a torsion spring attach to one of the pivot posts of the actuating member, a first distal end of the torsion spring is engaged with the mounting bracket, a second distal end of the torsion spring is engaged with the actuating member, and the torsion spring biases the actuating member rotating towards the extended position.

15. The computer enclosure of claim 9, further comprising a support member, wherein a hollow portion is formed at the computer bezel for mounting the support member, a securing opening is defined in one side wall of the hollow portion, a resilient piece is located on the support member, and the resilient piece is engaged with the securing opening.

* * * * *

UNITED STATES PATENT AND TRADEMARK OFFICE
CERTIFICATE OF CORRECTION

PATENT NO. : 8,437,132 B2  
APPLICATION NO. : 12/879345  
DATED : May 7, 2013  
INVENTOR(S) : Lin et al.

Page 1 of 1

It is certified that error appears in the above-identified patent and that said Letters Patent is hereby corrected as shown below:

On the title page, replace Item (30) regarding "Foreign Application Priority Data" with the following:

(30)    Foreign Application Priority Data

April 30, 2010    (CN) ........................2010 1 0161119

Signed and Sealed this  
Fifteenth Day of October, 2013

Teresa Stanek Rea  
*Deputy Director of the United States Patent and Trademark Office*